United States Patent [19]
Carlson

[11] 3,764,656
[45] Oct. 9, 1973

[54] PREPARATION OF PHOSPHATES
[75] Inventor: Ronald H. Carlson, Willingboro, N.J.
[73] Assignee: Hooker Chemical Corporation, Niagara Falls, N.Y.
[22] Filed: Feb. 25, 1972
[21] Appl. No.: 229,573

Related U.S. Application Data
[63] Continuation-in-part of Ser. No. 788,096, Dec. 30, 1968, abandoned.

[52] U.S. Cl. .............................................. 423/311
[51] Int. Cl. ...................... C01b 15/16, C01b 25/26
[58] Field of Search ..................... 423/299, 304–315

[56] References Cited
UNITED STATES PATENTS
3,427,125   2/1969   Hayakawa et al. .................. 423/309
3,294,486  12/1966   Cremer et al. ...................... 423/309

Primary Examiner—Oscar R. Vertiz
Assistant Examiner—George A. Heller
Attorney—Peter F. Casella et al.

[57] ABSTRACT

Phosphorus values are recovered from phosphate crystal mother liquor by contacting the liquor with finely divided calcium salts at elevated temperatures to precipitate hydrated octacalcium phosphate. Ca/P input is specific.

3 Claims, No Drawings

PREPARATION OF PHOSPHATES

This is a continuation-in-part of copending application Ser. No. 788,096, filed Dec. 30, 1968 and now abandoned.

This invention relates to the recovery of phosphorus values from alkali metal phosphate and ammonium phosphate solutions. More particularly, the invention relates to the preparation of hydrated octacalcium phosphate by the reaction of a calcium salt and alkali metal phosphate or ammonium phosphate solutions under specific reaction conditions.

In preparing alkali metal or ammonium phosphates from crude wet-process phosphoric acid, the phosphoric acid obtained from the acidulation of phosphate rock is reacted with an appropriate alkali metal or ammonium compound in the conventional manner. Precipitated wet-acid impurities are then separated from the phosphate solution, and the alkali metal or ammonium phosphate recovered, for example, by crystallization procedures. A considerable amount of the input phosphorus values, from about 5–10 percent, is retained in the phosphate crystal mother liquor after the phosphate crystals have been separated, which must be recovered for favorable process economics. Typically, the phosphorus is recovered in the form of dicalcium phosphate by reacting the phosphate crystal liquor with a calcium compound such as gypsum or lime. Recovery of phosphorus values by such reactions is presently accomplished under inefficient process conditions and yield an unsatisfactory product. For example, reacting phosphate crystal liquor and calcium sulfate at temperatures below those of the present invention results in a calcium phosphate precipitate which has a low filtration rate and is difficult to purify. Further, if calcium to phosphorus input ratios of stoichiometric quantities are utilized, as is customary, much of the phosphate will not be recovered. If CA/P input ratios exceeding those of the present invention are utilized, the total phosphate recovery is not enhanced and it is furthermore detrimental to the product, as impurities in the form of sulfates will contaminate the product, rendering it commercially undesirable.

According to the present invention, a calcium salt is added to an alkali metal/ammonium phosphate solution, in an amount sufficient to provide a Ca/P input mole ratio of from about 1.30/1 to 1.35/1, while maintaining the temperature of the phosphate reaction mixture at temperatures within the range of from about 80° C to about 90° C and the pH at from about 4 to about 6. When these conditions are adhered to, an earthy precipitate of predominantly hydrated octacalcium phosphate, having a filtration rate of about 100 to 200 gallons per square foot/hour is obtained, containing minimal sulfate impurities, with total phosphate recovery from about 80° to 95 percent. Additionally, rapid equilibration of the reactants is attained, markedly reducing the usual reaction time. The improved process of the present invention may be contrasted with prior art procedures which typically yield a slimy, difficultly washable precipitate with low filtration rates, and which are inefficient, both with respect to slow reaction rate and total phosphate recovery. It is preferred that a finely divided calcium sulfate reactant be employed to maximize the rate of attainment of an equilibrium between input calcium sulfate and solution phosphorus values. While a coarse input feed of calcium sulfate may be used in the process with satisfactory results in terms of filterability and handling characteristics of the basic calcium phosphate, the rate and extent of the reaction will be low, with concomitant increase of sulfate impurities in the product. Lime, calcium chloride, calcium chloride/lime mixtures and calcium sulfate/lime mixtures, may suitably be substituted for calcium sulfate as the calcium-containing reactant.

According to a preferred embodiment of the present invention, a finely divided calcium sulfate slurry is added to a preheated disodium phosphate crystal mother liquor containing for example about 2.5 percent phosphate, about 0.1 percent sulfate, and about 0.2 percent fluorine in amounts sufficient to provide a calcium-to-phosphorus input ratio of about 1.30 to 1 to about 1.35 to 1. The phosphate crystal liquor is preheated to temperatures within the range of from about 80°C to about 90°C, and the reaction mixture is maintained at a temperature within this range during slurry addition and up until termination of the reaction. The duration of the reaction will vary, however, a period of about 10 minutes may be required to insure complete equilibration of the reactants. The equilibrium pH of the reaction slurry will vary according to the composition of the phosphate crystal liquor; however, typical phosphate crystal liquor compositions will give an equilibrium pH of from about 4.0 to about 6.0 at 85°C.

The reaction may be best represented by the following general equation:

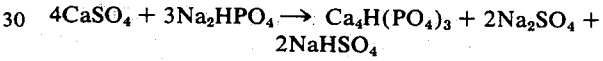

Hydrated octacalcium phosphate is the predominant product, with minor proportions of dicalcium phosphate and hydroxyapatite present.

At the termination of the reaction, the hydrated octacalcium phosphate slurry is separated from the reaction mixture by known means, and washed and dried. A slurry filtration rate of from about 100 to 200 gallons per square foot/hour for a filter cake of ⅜ inch thickness is commonly obtained by this process.

The composition of the product represents a phosphate recovery of from about 80–90 percent although percentages of 93 percent or better are not unusual. The exact composition of the product is naturally dependent on the composition of the phosphate crystal liquor reactant; however, an average phosphate crystal liquor would yield a product having the following representative composition:

47.0 – 50.5% $PO_4$
3.0 – 6.0% $SO_4$
30.0 – 32.5% Ca
0.4 – 0.6% F
Ca/P(mole ratio) 1.26 – 1.36/1
P/F (weight ratio) 26 – 41/1

The hydrated octacalcium phosphate product is particularly suitable for use as an animal feed suppliment, or as a fertilizer additive. Although the process has been described with particular reference to the recovery of phosphorus values from phosphate crystal mother liquor obtained from the crystallization of alkali metal or ammonium phosphates from wet-process phosphoric acid, the process is equally applicable to the recovery of phosphorus values from solutions containing soluble phosphorus salts of alkali metals or ammonium, generally. For example, the dialkali metal or diammonium phosphate crystals separated from the phosphate crystal mother liquor starting material described above may be dissolved in sufficient water to form a concentrated solution thereof. This solution may then be reacted with calcium sulfate according to the process of the present invention to yield an earthy precipitate of basic calcium phosphate containing an exceptionally high percentage of the phosphorus content of the phosphate starting material. Further, crude alkali metal ammonium phosphate liquor obtained by reacting wet-process phosphoric acid and an appropriate alkali metal base or ammonia in a known manner, followed by extraction of the solution phosphorus salts with a suitable solvent may be reacted with calcium salts according to the present process with comparable results. Other suitable sources of the phosphate mother liquor include purified alkali metal phosphate solutions as obtained by the process of U.S. Pats. Nos. 3,305,304 and 3,305,305. Either primary, secondary or trialkali metal phosphate solutions, or primary, secondary or triammonium phosphate solutions are utilizable in the process of this invention. It is to be appreciated, however, that where the phosphates used are the primary phosphates, i.e., monoalkali metal or ammonium phosphates it may be necessary to add additional base, e.g., lime, to maintain the proper, desired pH of the slurry.

The particular conventional process which may be used to obtain either the phosphate crystal mother liquor or the crude phosphate liquor may be selected according to the results sought. That is, if it is desired to utilize the hydrated octacalcium phosphate product as a feed supplement, processes that substantially eliminate the wet acid impurities, such as fluorine, should be used. Less exacting methods may be employed when lower purity of the end product is required, for example when the intended use is as a fertilizer.

The following examples will serve to illustrate the process of this invention.

EXAMPLE 1

455g of finely divided 5 percent calcium sulfate slurry was slowly added with stirring to 500 g of disodium phosphate crystal mother liquor (mother liquor analysis: 2.44% $PO_4$, 0.08% $SO_4$, 0.17% F). Temperature was maintained at 80–90°C during slurry addition, sufficient slurry was added to give an input Ca/P mole ratio of 1.30/1. After calcium sulfate addition, the resulting phosphate slurry was stirred for 5 minutes at a temperature of 80–90°C to ensure complete equilibration, slurry pH read 5.6 (87°C) at this point. The slurry was filtered hot on a Buchner funnel fitted with a Dacron cloth, a filter rate of 179 gallons per square foot per hour was obtained. The earthy-green filter cake was washed with 238g of 25°C distilled water and was subsequently oven dried at 115°C. The yield of dry filter cake (low density, tan, free-flowing powder) indicated a phosphate recovery of 91.4 percent. The recovered phosphate product gave the following analysis:

| | |
|---|---|
| % $PO_4$ | 55.3 |
| % $SO_4^{-2}$ | 1.97 |
| % $Ca^{+2}$ | 30.21 |
| % F | 0.39 |
| % AS | 0.50ppm |
| P/F (weight ratio) | 46/1 |
| Ca/P (mole ratio) | 1.26/1 |
| % of total $PO_4^{-3}$ | 4.9 |
| % of total $PO_4^{-3}$ soluble in neutral citrate | 68.0 |
| % of total $PO_4^{-3}$ soluble in 0.4% HCL complete | |

The analysis indicates suitability of the product as an animal feed supplement.

EXAMPLE II

The procedure of Example I was followed, with the exception that the temperature was maintained at 25–30°C during slurry addition and until equilibrium was reached. The phosphate slurry required more than 15 minutes to attain complete equilibration. The filtration rate was less than 90 gallons per square foot per hour. The filter cake was slimy, and difficultly washable.

What is claimed is:

1. A process for the recovery of phosphorus values as hydrated octa calcium phosphate, from solutions containing soluble phosphorus salts of alkali metals or ammonia which comprises reacting a calcium salt selected from the group consisting of calcium sulfate, calcium oxide, calcium chloride, calcium chloride/calcium oxide mixtures and calcium sulfate/calcium oxide mixtures with a solution containing at least one phosphate selected from the groups consisting of primary, secondary and triammonium phosphates and primary, secondary and tri-alkali metal phosphates, said calcium salt present in amounts sufficient to provide a calcium: phosphorus mole ratio in the initial reaction mixture of from about 1.30:1 to about 1.35:1, maintaining the reaction mixture at a temperature of from about 80°C to about 90°C and a pH of from about 4 to about 6 for a period sufficient to precipitate hydrated octacalcium phosphate.

2. The process of claim 1 wherein the phosphate solution is a phosphate crystal liquor obtained by crystallizing at least one compound selected from the group consisting of primary, secondary and tri-alkali metal phosphates and primary, secondary and tri-ammonium phosphates from a solution containing at least one of said compounds, and separating the crystals from the phosphate crystal liquor.

3. The process of claim 1 wherein the calcium salt is calcium sulfate.

* * * * *